US011184558B1

(12) United States Patent
Zhang et al.

(10) Patent No.: US 11,184,558 B1
(45) Date of Patent: Nov. 23, 2021

(54) SYSTEM FOR AUTOMATIC VIDEO REFRAMING

(71) Applicant: ADOBE INC., San Jose, CA (US)

(72) Inventors: Lu Zhang, Dalian (CN); Jianming Zhang, Campbell, CA (US); Zhe Lin, Fremont, CA (US); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/900,435

(22) Filed: Jun. 12, 2020

(51) Int. Cl.
*H04N 5/262* (2006.01)
*G11B 27/031* (2006.01)
*G06K 9/00* (2006.01)
*G06K 9/46* (2006.01)

(52) U.S. Cl.
CPC ....... *H04N 5/2628* (2013.01); *G06K 9/00718* (2013.01); *G06K 9/4671* (2013.01); *G11B 27/031* (2013.01)

(58) Field of Classification Search
CPC ............. H04N 5/2628; G06K 9/00718; G06K 9/4671; G11B 27/031
See application file for complete search history.

(56) References Cited

U.S. PATENT DOCUMENTS 9,626,584 B2   4/2017  Lin et al.
10,867,422 B2  12/2020 Zhang et al.
2003/0001846 A1* 1/2003 Davis ............. H04N 5/772
                                                          345/474
2020/0304754 A1* 9/2020  Huynh Thien ......... G11B 27/28
2020/0351435 A1* 11/2020 Therkelsen ............ H04N 7/155

OTHER PUBLICATIONS

Wang, Q., Zhang, L., Bertinetto, L., Hu, W., & Torr, P. H. (2019). Fast online object tracking and segmentation: A unifying approach. In Proceedings of the IEEE/CVF Conference on Computer Vision and Pattern Recognition (pp. 1328-1338).
Wei, Z., Zhang, J., Shen, X., Lin, Z., Mech, R., Hoai, M., & Samaras, D. (2018). Good view hunting: Learning photo composition from dense view pairs. In Proceedings of the IEEE Conference on Computer Vision and Pattern Recognition (pp. 5437-5446).
(Continued)

*Primary Examiner* — Mishawn N. Hunter
(74) *Attorney, Agent, or Firm* — Shook, Hardy & Bacon, L.L.P.

(57) ABSTRACT

Systems and methods provide reframing operations in a smart editing system that may generate a focal point within a mask of an object for each frame of a video segment and perform editing effects on the frames of the video segment to quickly provide users with natural video editing effects. A reframing engine may processes video clips using a segmentation and hotspot module to determine a salient region of an object, generate a mask of the object, and track the trajectory of an object in the video clips. The reframing engine may then receive reframing parameters from a crop suggestion module and a user interface. Based on the determined trajectory of an object in a video clip and reframing parameters, the reframing engine may use reframing logic to produce temporally consistent reframing effects relative to an object for the video clip.

20 Claims, 8 Drawing Sheets

(56) References Cited

OTHER PUBLICATIONS

Jiang, M., Huang, S., Duan, J., & Zhao, Q. (2015). Salicon: Saliency in context. In Proceedings of the IEEE conference on computer vision and pattern recognition (pp. 1072-1080).

Tan, M., & Le, Q. (May 2019) Efficientnet: Rethinking model scaling for convolutional neural networks. In International Conference on Machine Learning (pp. 6105-6114). PMLR.

Everingham, M., Eslami, S. A., Van Gool, L., Williams, C. K., Winn, J., & Zisserman, A. (2015). The pascal visual object classes challenge: A retrospective. International journal of computer vision, 111(1), 98-136.

Li, B., Yan, J., Wu, W., Zhu, Z., & Hu, X. (2018). High performance visual tracking with Siamese region proposal network. In Proceedings of the IEEE conference on computer vision and pattern recognition (pp. 8971-8980).

Wang, W., Song, H., Zhao, S., Shen, J., Zhao, S., Hoi, S. C., & Ling, H. (2019). Learning unsupervised video object segmentation through visual attention. In Proceedings of the IEEE/CVF Conference on Computer Vision and Pattern Recognition (pp. 3064-3074).

Chen, J., Bai, G., Liang, S., & Li, Z. (2016). Automatic image cropping: A computational complexity study. In Proceedings of the IEEE Conference on Computer Vision and Pattern Recognition (pp. 507-515).

Jain, S. D., Xiong, B., & Grauman, K. (Jul. 2017). Fusionseg: Learning to combine motion and appearance for fully automatic segmentation of generic objects in videos. In 2017 IEEE conference on computer vision and pattern recognition (CVPR) (pp. 2117-2126). IEEE.

Wang, W., Lu, X., Shen, J., Crandall, D. J., & Shao, L. (2019). Zero-shot video object segmentation via attentive graph neural networks. In Proceedings of the IEEE/CVF International Conference on Computer Vision (pp. 9236-9245).

Lu, X., Wang, W., Ma, C., Shen, J., Shao, L., & Porikli, F. (2019). See more, know more: Unsupervised video object segmentation with co-attention Siamese networks. In Proceedings of the IEEE/CVF Conference on Computer Vision and Pattern Recognition (pp. 3623-3632).

Jiang, L., Xu, M., Liu, T., Qiao, M., & Wang, Z. (2018). Deepvs: A deep learning based video saliency prediction approach. In Proceedings of the european conference on computer vision (eccv) (pp. 602-617).

Wang, W., Shen, J., Guo, F., Cheng, M. M., & Borji, A. (2018). Revisiting video saliency: A large-scale benchmark and a new model. In Proceedings of the IEEE Conference on Computer Vision and Pattern Recognition (pp. 4894-4903).

Perazzi, F., Pont-Tuset, J., McWilliams, B., Van Gool, L., Gross, M., & Sorkine-Hornung, A. (2016). A benchmark dataset and evaluation methodology for video object segmentation. In Proceedings of the IEEE conference on computer vision and pattern recognition (pp. 724-732).

Li, B., Wu, W., Wang, Q., Zhang, F., Xing, J., & Yan, J. (2019). Siamrpn++: Evolution of siamese visual tracking with very deep networks. In Proceedings of the IEEE/CVF Conference on Computer Vision and Pattern Recognition (pp. 4282-4291).

* cited by examiner

SYSTEM FOR AUTOMATIC VIDEO REFRAMING

BACKGROUND

Users often rely on software to perform various editing tasks on videos. Editing software can support zooming, cropping and other reframing tasks or reframing operations for videos via a user interface on a computing device. As frame composition and visual effects around an object in an image frame is used to create visually appealing videos that are unique to the user and the user's style, reframing is often an important part of a video editing project. For example, depending on a user's desired feel for a video, the user may reframe frames of a video or video segment to focus on a subject or object of the video, remove an unwanted subject or irrelevant detail from an image, or change the aspect ratio of an image in order to improve the overall composition of the image.

SUMMARY

Various aspects of the technology described herein are generally directed to systems, methods, and computer storage media, for among other things, improving reframing operations (e.g., crop, zoom, pan, automatic focus) in a video. In this regard, a video may be accessed and object attributes (e.g., hotspot, bounding box, mask, trajectory) may be determined by a neural network. Based on these object attributes, reframing parameters may be determined or defined to automatically edit frames of the video in a video editing system In particular, a reframing engine of the video editing system in a computing environment processes videos or video clips (e.g., segments of a video) using tracked attributes that are extracted from image frames of the videos. For example, an eye-gaze network trained to detect a salient portion of an image may produce a hotspot map of predicted focal points in a video frame. These predicted focal points may then be used by a gaze-to-mask network, trained to detect objects based on an image and predicted focal points of the image, to determine objects in the image and generate an object mask for each of the detected objects. This process may then be repeated to effectively track the trajectory of objects and object focal points in videos. The reframing engine may further receive reframing parameters (e.g., start frame, zoom scale, reframing effect) from a crop suggestion module and a user interface. For example, the crop suggestion module may automatically generate a start/end frame (e.g., based on composition, crop scale and/or aspect ratio) or a user may select a start/end frame via a user interface. Based on the determined trajectory of the object in the video clip and the reframing parameters, the reframing engine may use reframing logic (e.g., a cropping algorithm) to produce temporally consistent reframing effects for the video clip. For example, the reframing engine may zoom, pan, or crop frames of a video relative to movements of a salient region of the object in the video to reframe each frame of the video. Advantageously, the systems, methods, and computer storage media described herein are object aware and, as such, video reframing effects may smoothly transition between the start and end frames.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
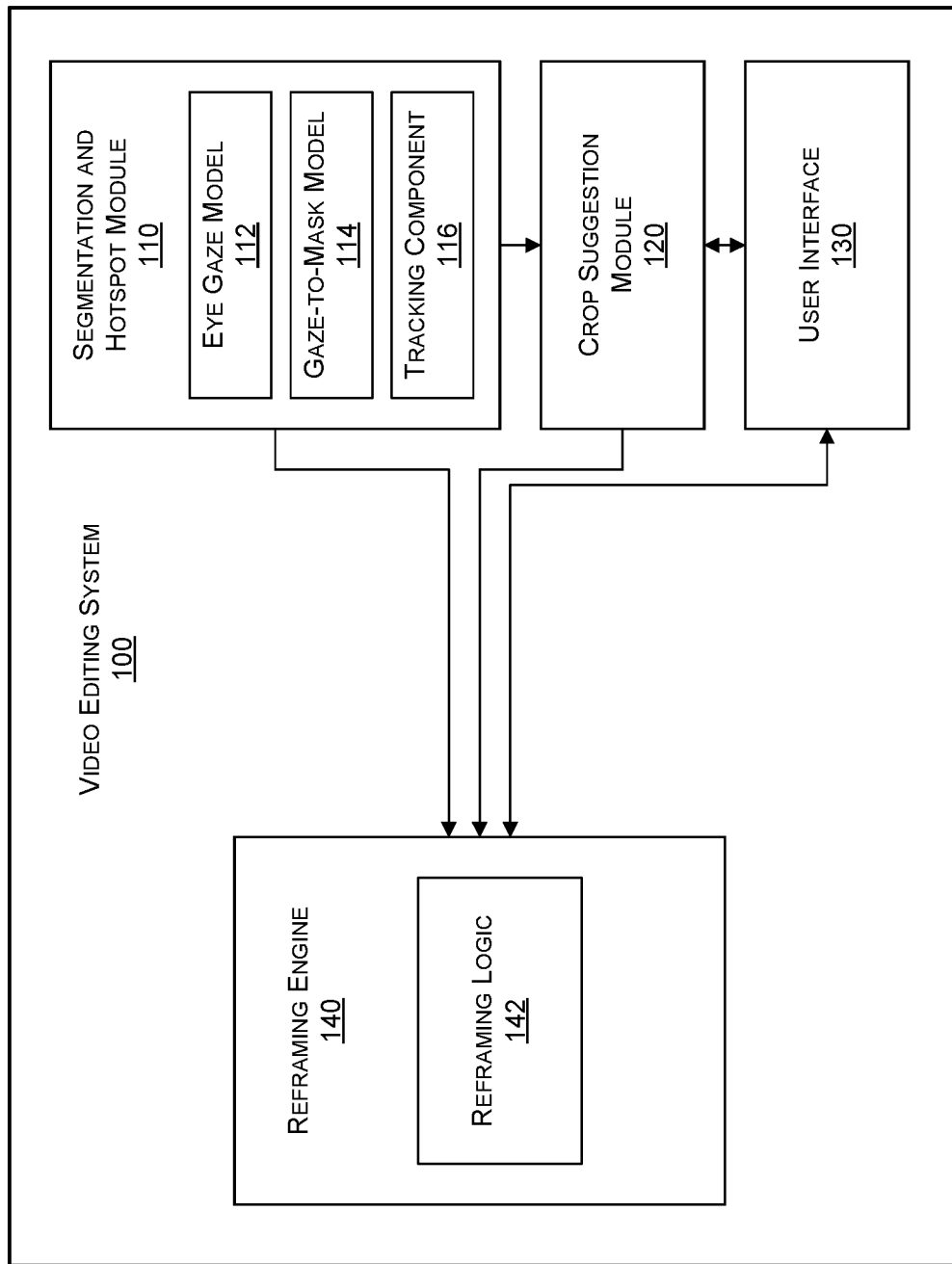
FIG. 1 illustrates an exemplary technical solution environment suitable for implementing embodiments a video editing system of the present invention.

The following detailed description describes technologies for the use of reframing operations in a smart reframing system that may generate a focal point within a mask of an object for each frame of a video segment and perform reframing effects on the frames of the video segment to quickly provide users with natural video reframing effects. The present invention has been described in relation to particular embodiments, which are intended in all respects to be illustrative rather than restrictive. Alternative embodiments will become apparent to those of ordinary skill in the art to which the present invention pertains without departing from its scope.

By way of further background, reframing images can be used to bring attention to (e.g., accentuate or isolate) subject matter from its background. Depending on a desired emphasis and composition, image processing techniques may be used to reframe images by cropping, zooming, changing an aspect ratio or the like. Extending image processing techniques to videos is difficult because performing specific reframing operations on thousands of video frames is tedious and time consuming. Moreover, manually editing each video frame independently while maintaining a desired composition for an object in the video often leads to temporal inconsistencies (e.g., harsh changes in a cropping box of a video), which can be very eye-catching and irritating to viewers. These temporal inconsistencies are often caused by the loss of coherence between neighboring frames as a result of editing videos frame by frame.

Conventional video processing software applications that support reframing images are not content aware and cannot accurately reframe the image as content (e.g., an object or portion of an object) moves throughout the canvas of the frame. In one conventional implementation, software relies on users to identify key content to preserve in a video. For example, in such a conventional system, a user selects an object at various points in a video and the video can be cropped to keep the object in the frame of the video based on the user selection. However, such conventional systems are limited in that they require a user to observe the video and identify important content across many video frames, which is incredibly time consuming and can lead to inaccuracies. Additionally, these systems are generally limited to placing a crop box relative to the location of the user selection or a center-point of an object mask. Such systems rely on substantial user input to determine a salient portion of a video frame. While some systems may rely on eye tracking to determine areas of interest, outputs from human eye tracking are often noisy and may not reliably identify an object of interest in the video segment.

Moreover, these conventional systems often require a user to select key frames for cropping. Such a conventional system then performs a simple linear interpolation between the key frames, which does not take into account an object location within the frames. Instead, conventional systems often rely on a user to track the object within frames of a video segment and identify the key frames to generate a reframing effect.

In other conventional systems for object tracking, a user draws a bounding box around an object in an initial frame in order for the system to know what object in a video segment is important. These systems are limited in that the user must view the video segment and make some determination as to what object is important in the video. Additionally, this limitation of conventional systems only allows for offline object detection and tracking because the user must view the video and determine important regions of a video frame.

Accordingly, embodiments of the present invention are directed to streamlined and efficient methods, systems, and computer storage media for improving video reframing operations (e.g., crop, zoom, pan) by determining attributes of objects in a video (e.g., hotspot, bounding box, mask, trajectory) and automatically editing video frames in a video editing system based on reframing parameters for editing the video frames and the determined attributes of the objects (e.g., hotspot, bounding box, mask, trajectory) in a computing environment. Specifically, a reframing engine of the video editing system in a computing environment may process videos or video clips (e.g., segments of a video) using a segmentation and hotspot module to determine a salient region of an object, generate a mask of the object, and track the trajectory of an object in the video clips. The reframing engine may then receive reframing parameters from a crop suggestion module and a user interface. Based on the determined trajectory of the object in the video clip and the reframing parameters, the reframing engine may use reframing logic (e.g., a cropping algorithm) to produce temporally consistent reframing effects for the video clip. Advantageously, by relying on intra-object focal point estimations of an object salient region for performing reframing operations, the system may track objects across frames of a video segment to provide convenient and consistent video reframing effects. Having briefly described an overview of aspects of the present invention, various terms used throughout this description are provided. Although more details regarding various terms are provided throughout this description, general descriptions of some terms are included below to provider a clearer understanding of the ideas disclosed herein:

Reframing is the process of changing the visibility of peripheral areas of a video frame (e.g., image background) using a cropping box. The process may be used to improve composition, change an aspect ratio, accentuate, or isolate an object from a background of the video frame. For example, a cropping box may pan across frames of a video segment, removing portions of the frames, to track an object and focus a viewer's attention on the object. Reframing effects may further include zoom out effects, which may add peripheral areas of a video frame. For example, a cropping box may increase in size during playback of a video segment to include more background elements not visible in an initial frame of the video segment.

Focal points are central or principal points of focus where a user may focus their attention. For example, a user viewing an image that includes a bicycle rider may focus their vision on the face of the bicycle rider. In this example, the position of the face of the bicycle rider in the image is a focal point of the image.

Objects are anything that is visible in an image and has a relatively stable form. In general, as used herein, objects are separate and distinct from a background of an image and may move relative to the background of the image. For example, in an image of a car on a roadway, the car is considered an object of the image and the roadway is considered the background of the image.

Hotspots are intra-object focal points for a target object that are produced by a neural network trained to predict salient portions of an image. For example, the hotspot for an image of a dancing woman may be the face of the dancing woman if the neural network determines that the face of the dancing woman is the point in the image that is most likely to be focused on by a user.

A mask (e.g., object mask) identifies pixels of an object in an image to distinguish the object from the background of the image or other secondary elements of the image (e.g., producing a binary object mask). For example, a mask for an image of a camel in a zoo would comprise the pixels that produce the image of the camel.

A composite image is an image made up of at least one hotspot and at least one object mask, each overlaid on an original image used to generate the at least one hotspot and at least one object mask. For example, an image of a dancing woman may be used to produce a hotspot located on the face of the woman and to produce a mask that identifies the pixels associated with the woman. The hotspot and the mask may be combined with the original image of the woman dancing to create an image where the hotspot, mask, and background of the image are visible and where the dancing woman is occluded by the mask and hotspot.

Object trajectory is the line of travel of an object across a plurality of image frames of a video segment. The trajectory may be sequentially determined based on post-processing operations or predicted based on a trained neural network by tracking the movement of an object in a video segment. For example, as the coordinate position of a car changes in frames of a video, the position may be tracked and the change in position with respect to time may be used to determine the trajectory of the car in the video.

Reframing logic is an algorithm for producing consistent reframing effects on video segments based on attributes of objects in a video (e.g., hotspot, bounding box, mask, trajectory). For example, the reframing logic may use inputs from a segmentation and hotspot module, crop suggestion module, and user interface to calculate the position of cropping boxes in order to maintain temporal consistency of the cropping boxes relative to an object by using both the object's hotspot and mask from the segmentation and hotspot module as reference points for the cropping box. Further, as the object location changes throughout frames of a video segment, an offset from the combination of reference points (i.e., hotspot and mask) may be calculated to keep track of the object and produce linear relative movements.

Reframing parameters are variables associated with subprograms of the video editing system (e.g., image crop, zoom, pan, etc.) that may be given specific values during the execution of a subprogram. For example, a user may select a zoom effect subprogram to apply to a video segment and may specify parameters for a level of zoom. Further, reframing parameters may be modified by the video editing system based on inputs from additional components of the system (e.g., eye-gaze model, gaze-to-mask model, crop suggestion module, etc.) and/or to account for object movement within frames of a video segment Automatic zoom is an automatic zoom in or zoom out effect generated based on user-defined zoom and speed parameters. For example, a user may define a zoom scale (e.g., between 0.4-0.9) via a selection indicator of a user interface. The user may then select a selection indicator to perform the zoom effect and subsequently view the zoom effect in a display window.

User specified zoom is an automatic zoom in or zoom out effect generated based on user-defined start and end cropping boxes under different aspect ratios. For example, based on a start crop box of a start frame, an end crop box of an end frame of a video, and a user-specified aspect ratio for each crop box, the reframing engine, using reframing logic, may reframe each frame of the video to provide a smooth transition from the start crop box and aspect ratio to the end crop box and aspect ratio.

Retargeting is a reframing effect for cropping an image frame to change the aspect ratio of a video, while maintaining hotspots and masks within the cropped image frame of the video based on user-defined start and end cropping boxes. For example, a user may select a start frame, an end frame and an aspect ratio and the system may crop the frames of the video to match the selected aspect ratio, while maintaining the hotspots and masks within the cropped frames.

Video slide show is a feature used to produce smoothing transitions when switching between videos or video segments. The smoothing transitions may be user defined or may be automatically generated by the editing engine based on either inputs from the composition module or randomly generated crop boxes. For example, given more than one video, the system may perform consistent reframing effects on each video and produce smoothing transitions during video switching.

Aspects of the technical solution can be described by way of examples and with reference to FIG. 1. FIG. 1 illustrates an exemplary technical solution environment suitable for implementing embodiments of the present invention. Generally, the technical solution environment includes a video editing system for reframing operations using a reframing engine. With reference to the example illustrated in FIG. 1, the video editing system 100 includes a segmentation and hotspot module 110. The segmentation and hotspot module 110 includes an eye-gaze model 112, a gaze-to-mask model 114, and a tracking component 116. The system 100 also includes a crop suggestion module 120, operable to generate start/end frames of a video segment. The video editing system 100 also includes a user interface 130, operable to allow a user to define reframing parameters, display video segments, and modified versions of video segments. The video editing system 100 also includes a reframing engine 140, operable to produce a temporally consistent editing effects for a video segment. The reframing engine 140 includes reframing logic 142, operable to maintain an object within a cropping box and adjust the coordinate position of the cropping box relative to a focal point (e.g., hotspot) and an object mask. The reframing engine 140 may receive inputs from each of the segmentation and hotspot module 110, crop suggestion module 120, and the user interface 130. Further, outputs from the segmentation and hotspot module 110 may be communicated to the crop suggestions module 120. Outputs from the crop suggestion module 120 may be communicated to the user interface 130. Outputs from each of the user interface 130 and the reframing engine 140 may be communicated with each other. Although several components are generally discussed herein as being associated with video editing system 100, in some cases, various components, or some portion thereof, may additionally or alternatively be integrated into an operating system (e.g., as a service) or a server (e.g., a remote server), or into a stand-alone application.

The reframing operations of the technical solution described herein support generating a focal point within a generated mask of an object for each frame of a video segment and performing reframing operations on the frames of the video segment. Generally, the reframing operations may be implemented using the present video editing system (i.e., segmentation and hotspot module 110, crop suggestion module 120, user interface 130, and editing engine 140), or portions thereof, that supports reframing operations that are executed to generate, using an eye tracking neural network (e.g., eye-gaze model 112) and an object masking neural network (e.g., gaze-to-mask model 114), a focal point within a mask of an object for each frame of a video segment. The reframing operations may be further executed to reframe each frame of the video segment based on the focal point within the mask of the object, the mask of the object, reframing suggestions and a set of user-defined reframing parameters.

The segmentation and hotspot module 110 of the video editing system 100 may support determining attributes of an object (e.g., location, size, trajectory, focal point, object mask) and output these attributes to the reframing engine. To determine object attributes, the segmentation and hotspot module may employ an eye-gaze model 112, a gaze-to-mask model 114, and a tracking component 116. The eye-gaze model 112 of the segmentation and hotspot module may be a neural network trained for predicting eye-gaze (e.g., eye tracking) to provide a prediction of a salient region of at least one object (i.e., a hotspot and/or hotspot map) in a frame of a video. Based on this prediction, the gaze-to-mask model 114 of the segmentation and hotspot module may receive the predicted salient region of the object from the eye-gaze model 112 and generate a mask for the object. Further, based on the hotspot and the object mask for an initial frame of a video segment, the tracking component 116 of the segmentation and hotspot module may process the video segment to determine a hotspot map and mask of the object in each frame of the video segment, effectively tracking the object across the frames of the video segment.

The eye-gaze model 112 of the segmentation and hotspot module 110 supports producing a hotspot map of a frame of a video. A hotspot is a salient portion of an image that is an intra-object focal point for a target object that is produced by a trained neural network. For example, the hotspot for an image of a dancing woman may be the face of the dancing woman if the neural network determines that the face of the dancing woman is the point in the image that is most likely to be focused on by a user. To generate this hotspot, the eye-gaze model 112 leverages an encoder to extract features from the image. As discussed in more detail in FIG. 4, the encoded image is then decoded using residual refinement blocks, up-sampling at each block, to produce a hotspot map. The hotspot map may predict a single focal point or multiple focal points within a frame, depending on the image. Additionally or alternatively, a user may wish to identify the salient region of the image. For example, the user may select a focal point in the image via the user interface 130 by clicking on an object. Further, a user may use an eye tracker to measure eye positions and eye movement to identify salient regions of the image. As used herein, a hotspot map may comprise predicted focal points generated by the eye-gaze model 112 or user-defined focal points selected via the user interface 130 or generated via an eye tracker. The present disclosure generally discusses exemplary embodiments in which a hotspot map is produced via eye-gaze model 112. However, the description exemplary embodiments are not intended to limit the scope of this patent. Rather, the inventors have contemplated that the claimed subject matter might also be embodied in other ways, to include different steps or combinations of steps similar to the ones described in this document.

The gaze-to-mask model 114 of the segmentation and hotspot module 110 supports producing a mask of an object in a frame of a video. A mask (e.g., object mask) identifies pixels of an object in an image to distinguish the object from the background of the image or other secondary elements of the image (e.g., producing a binary object mask). For example, a mask for an image of a camel in a zoo would comprise the pixels that produce the image of the camel. To generate this mask, the gaze-to-mask model 114 may first receive an image that includes the camel, and a hotspot map of that image to identify the salient region of the image. The gaze-to-mask model 114 may then encode a concatenation (e.g., combination or integration) of the image and the hotspot map to extract features from the image and the hotspot map. Similar to the eye-gaze model 112, the encoded concatenation is then decoded using residual refinement blocks, up-sampling at each block, to produce the object mask.

The tracking component 116 of the segmentation and hotspot module 110 supports generating a mask and hotspot map for each frame of a video segment, effectively tracking the object in the video segment. To produce a tracked video segment, the tracking component may first receive an initial frame of a video segment from the eye-gaze network and the gaze-to-mask network. Based on the initial frame, which includes an object mask, the tracking component may employ a neural network (e.g., such as SiamRPN) to generate a bounding box for a target object based on the object mask in the initial frame. The bounding box may then be used to crop the initial frame to a smaller size such that the object fills a substantial portion of the frame. The cropped initial frame may then be used as a template by the tracking component to generate bounding boxes, and corresponding cropped frames, for each frame of the video segment. The tracking component may then process these cropped frames to track the object in the video segment and to identify a hotspot map and object mask for each frame of the video segment. Advantageously, by tracking the object rather than tracking pixels, object deformations and movements are more accurately tracked. Additionally, by tracking the object within a cropped frame rather than the full frame, the resolution of the object is less influenced by the image background of the object and, as such, the object retains more detail.

In an exemplary embodiment of the tracking component 116, the tracking component may use a bounding box of object mask M°, which may be generated by the gaze-to-mask model 114, as a template for tracking the object in subsequent frames of a video segment. The tracking component may then receive each frame of the video segment and generate a bounding box B for a target object. A mask and hotspot generation network of the tracking component may then produce a mask and hotspot map for the tracked object.

The crop suggestion module 120 of the video editing system 100 shown in FIG. 1 supports generating a start/end frame based on a combination of user inputs and machine learning. For example, a user may define a size (e.g., 50% of original) and an aspect ratio (e.g., 16:9) for a cropping box, and a machine learning module may generate a set of candidate crop boxes with composition scores for each candidate crop box. For example, as described in additional detail below in FIG. 2, the placement of the hotspot and the object mask within the frame of the crop candidate may be evaluated based on the rule of thirds, visual balance, region size, etc. Then, a crop box may be selected based on whichever crop box has the highest composition score. The candidate crop boxes may further be output to and displayed via user interface 130 to allow a user to select a preferred crop box.

The user interface 130 of the video editing system 100 allows a user to define reframing parameters (e.g., cropping boxes, speed, aspect ratio, reframing effect) and provides at least an operation window, display window, progress slider, and operation controls. The operation window allows a user to interact with frames of a video. For example, a user may identify focal points or draw bounding boxes on frames of the video (e.g., start/end boxes for the video cropping process). The display window may display the video with a completed reframing effect applied to a video segment. The progress slider may indicate the indexes of video frames (e.g., showing progress during video playback). The operation controls may provide indicators (e.g., showing status of video playback and reframing), playback controls, operation controls to set an initial editing status (e.g., start/end/zoom/mask), and list controls to allow users to select different settings for the editing process (e.g., speed/scale/aspect ratio/result).

The reframing engine 140 of the video editing system 100 includes reframing logic 142, which may be used to produce consistent reframing effects on input videos. Reframing effects may remove some peripheral areas of a video frame (e.g., image background) using a cropping box to improve composition, change an aspect ratio, accentuate, or isolate an object from a background of the video frame. For example, a cropping box may pan across frames of a video segment, removing portions of the frames, to track an object and focus a viewer's attention on the object. Reframing effects may further include zoom out effects, which may add peripheral areas of a video frame. For example, a cropping box may increase in size during playback of a video segment to include more background elements not visible in an initial frame of the video segment. As indicated above, the reframing engine 140 may receive reframing parameters and object attributes from several components including segmentation and hotspot module 110, crop suggestion module 120, and user interface 130.

The reframing logic 142 may use inputs from the segmentation and hotspot module 110, crop suggestion module 120, and user interface 130 to maintain temporal consistency of cropping boxes relative to an object by using both the object's hotspot map and object mask from the segmentation and hotspot module 110 as reference points for the cropping box. As discussed in additional detail in FIG. 4, based on the position of the hotspot/mask and reframing parameters from the user interface 130 and/or the crop suggestion module 120, the reframing logic 142 may define an offset with regards to the center of the hotspot and corners of a bounding box surrounding the object mask. For example, as the object location changes throughout frames of a video segment, an offset from the combination of reference points (i.e., hotspot map and mask) is used to keep track of the object and produce linear relative movements using the reframing logic.

To maintain temporal consistency, the reframing logic 142 relies on referencing a hotspot map and an object mask for a given frame of a video segment. Given an object masks $\{M_t\}_{t=0}^{T}$ and hotspot heat maps $\{E_t\}_{t=0}^{T}$ for video clips $\{I_t\}_{t=0}^{T}$ the reframing logic may produce cropping boxes $\{B_t\}_{t=0}^{T}$. To maintain a high-order smoothness of the cropping boxes, the cropping boxes may be represented as polynomial functions of t where $(b^x_t, b^y_t, b^h_t,)$ may be coordinates of a top-left corner of crop window t, as well as the height of the crop window. The width of the crop window may be omitted because the width may be determined based on a specified aspect ratio and height. The $B_0 = B_s$ and $B_T = B_e$ may be defined by a user or by the crop suggestion module 120 as the start/end box. An optimization function may be formulated as:

$$\text{Min } \lambda_1 \|O_t^E - \hat{O}_t^E\|_2^2 + \lambda_2 \|O_t^{M1} - \hat{O}_t^{M1}\|_2^2 + \lambda_3 \|O_t^{M2} - \hat{O}_t^{M2}\|_2^2$$

In the above optimization function, $O_t^E$ is the offset with regard to the center of a hotspot map $E_t^{x,y}$. The offset may be defined as:

$$O_t^E = (E_t^{x,y} - B_t^{x,y})/B_t^{w,h}$$

A hotspot optimization target may be represented as $\hat{O}_t^E$, which may be calculated as a linear function from a start offset to an end offset. The optimization target may be defined as:

$$\hat{O}_t^E = f(O_0^E, O_{T,t}^E) = ((O_T^E - O_0^E)/T)t + O_0^E$$

Apart from the hotspot offset, the reframing logic also takes into consideration a mask offset from top-left and bottom right locations of the object mask, $M_t^1$ and $M_t^2$ of the object mask, which are denoted as $O_t^{M1}$ and $O_t^{M2}$. Similar to the above definition for the hotspot offset, the mask offset with $M_t^1$ may be represented as:

$$O_t^{M1} = (M_t^1 - B_t^{x,y})/B_t^{w,h}$$

A mask optimization target for the top-left location may be represented as $\hat{O}_t^{M1}$, which may be calculated as a linear function from a start offset to an end offset. The optimization target may be defined as:

$$\hat{O}_t^{M1} = f(O_0^{M1}, O_{T,t}^{M1}) = ((O_T^{M1} - O_0^{M1})/T)t + O_0^{M1}$$

An offset for the bottom-right location of the object mask may be defined as:

$$O_t^{M2} = 1 - (M_t^1 - B_t^{x,y})/B_t^{w,h}$$

An optimization target for the bottom-right location of the object mask may be defined as:

$$\hat{O}_t^{M2} = f(O_0^{M2}, O_{T,t}^{M2}) = ((O_T^{M2} - O_0^{M2})/T)t + O_0^{M2}$$

Advantageously, the reframing logic will contain the object by the cropping box and the position of the object in the cropped video will have a smooth transition across all frames between start and end frames. Moreover, the reframing logic may optimize reframing composition by relying on the hotspot map and object mask as reference points, rather than relying on a single reference point for the object, as in some conventional systems.

The reframing engine 140 may automatically apply reframing effects to a video based on inputs to the reframing logic 142 from the segmentation and hotspot module 110, the crop suggestion module 120, and the user interface 130. By way of example, reframing effects may include, at least, automatic zoom, user-specified zoom, and retargeting. Automatic zoom may apply the reframing logic 142 to provide users with a simple way of producing zoom effects (e.g., zoom in and zoom out) based on specified parameters. For example, the reframing engine may produce customized zoom effects based on receiving, via a user interface, a user-specified zoom scale and speed. User-specified zoom may apply the reframing logic 142 to allow users to define an aspect ratio and a start and/or end crop box for a reframing effect. For example, based on a start crop box of a start frame, an end crop box of an end frame of a video, and a user-specified aspect ratio for each crop box, the reframing engine 140, using the reframing logic 142, may reframe each frame of the video to provide a smooth transition from the start crop box and aspect ratio to the end crop box and aspect ratio. In some embodiments, the aspect ratio may be automatically defined based on a resolution/aspect ratio of a display screen such that frames of a video segment may be reframed to retarget the object in the frame based on the resolution/aspect ratio. Additionally, this may be done while a reframing effect is performed by the reframing engine.

Further, each of the reframing effects may be used to generate a video slide show where a selected retargeting effect may be used to produce smoothing transitions when switching between videos or video segments. The smoothing transitions may be user defined or may be automatically generated by the reframing engine based on either inputs from the composition module or randomly generated crop boxes.

Figure 2:
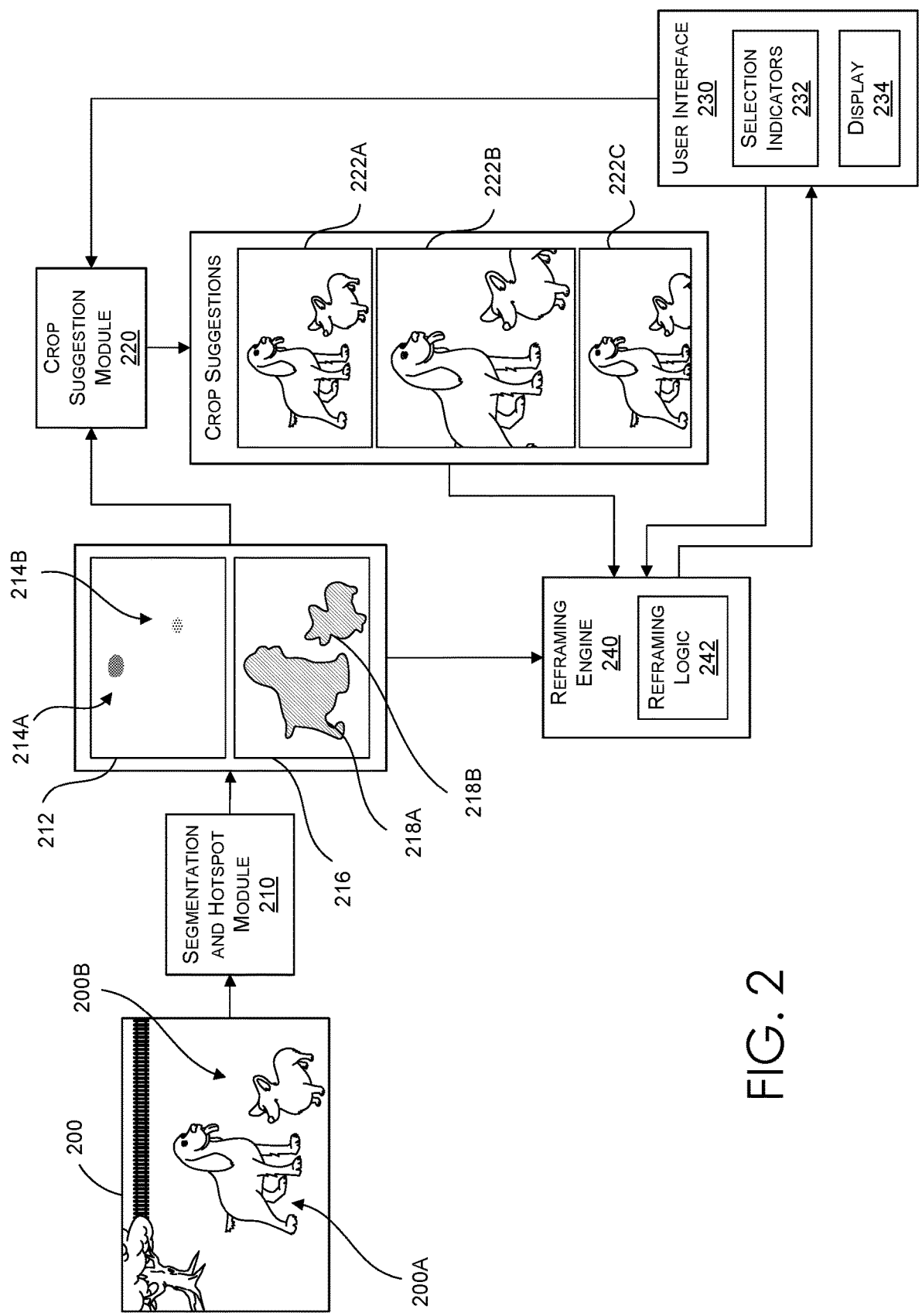
FIG. 2 illustrates an exemplary process for reframing a video segment, in accordance with embodiments of the present invention.

With reference to FIG. 2, FIG. 2 illustrates an exemplary process for reframing a video segment, in accordance with embodiments of the present invention. FIG. 2 shows an initial frame 200 of a video segment, segmentation and hotspot module 210, hotspot map 212 of the initial frame 200, object mask map 216 of the initial frame 200, crop suggestion module 220, crop suggestions (222A, 222B, and 222C), user interface 230 with selection indicators 232 and display 234, and reframing engine 240 with reframing logic 242.

In operation, the segmentation and hotspot module 210 may receive the initial frame 200 of a video segment and process the initial frame 200 to produce a hotspot map 212 and object mask map 216 of the initial frame. For example, as can be seen in FIG. 2, the segmentation and hotspot module 210 may produce hotspot map 212 with identified hotspots 214A and 214B, where hotspot 214A corresponds to the head of the dog 200A in the initial frame 200 and hotspot 214B corresponds to the head of the dog 200B in the initial frame 200. Further, based on hotspots 214A and 214B, the segmentation and hotspot module 210 may produce object mask map 216 with masks 218A and 218B, where mask 218A corresponds to the overall shape of dog 200A and mask 218B corresponds to the overall shape of dog 200B.

In some embodiments, the hotspot map 212 and the object mask map 216 may be output to the crop suggestion module 220 to produce a set of crop suggestions (e.g., 222A, 222B, 222C). The crop suggestion module 220, using a neural network (e.g., DCNN—"Deep Convolutional Neural Network"), may generate a set of crop candidates for reframing the initial frame 200 and/or an end frame of a video segment based on user-specified parameters (e.g., aspect ratio and scale) received from the user interface 230 via selection indicators 232. The set of crop candidates may then be evaluated by the crop suggestion module 220 based on the frame composition relative to the hotspot map 212 and the object mask map 216 to determine which crop candidates provide the best frame composition. For example, to evaluate crop candidates, each candidate of the pool of crop candidates may be filtered based on determining whether the hotspot (e.g., 214A and 214B) and object mask (e.g., 218A and 218B) are included in the crop and where the hotspot and object mask are located within the crop. Based on where the hotspot and object mask are located within each candidate crop, each candidate crop may be assigned a composition score. A composition score may be calculated based on a combination of several techniques. For example, a rule of thirds technique may find the center of gravity of an object based on a hotspot map and an object mask and evaluate a candidate crop box based on the position of the center of gravity of the object relative to the crop box. A triangle composition technique may discover a smallest triangle which can enclose the center of gravity of the object. A vanishing point technique may search an intersection point with the highest number of lines. A frame within a frame technique may calculates a rectangular area of the background. An intensity balance technique may compare a difference of gray scale values between a right-half image and a left-half image. Each composition method may generate a corresponding score, which may be summed and/or weighted to generate a composition score for each candidate crop box. Further, each candidate may be filtered based on the assigned composition scores. Based on the results of the filtering process, a set of crop suggestions with the highest candidate score may be generated and output to the reframing engine 240 and the user interface 230. Advantageously, a user may only be presented with crops which exhibit preferable placement of the objects within the crop box.

The reframing engine 240 may receive the hotspot map 212, the object mask 216, crop suggestions (222A, 222B, and 222C), and user-specified parameters (e.g., aspect ratio and scale) received from the user interface 230 via selection indicators 232. Using the reframing logic 242, the reframing engine 240 may produce a temporally consistent reframing effect for the video clip. For example, frames of the video segment may be cropped to perform a zoom effect that begins with the initial frame 200, which includes more background elements of the image, and ends with crop suggestion 222A, which focuses on the pair of dogs (200A and 200B) and excludes background elements. Based on cropping frames of the video segment, a new version of the video segment may be produced which includes the zoom effect. The new version of the video segment may then be displayed on display 234 of the user interface. The original version of the video segment and the new version of the video segment may be displayed next to each other in a single display window to allow a user to view the original video segment and the new video segment side-by-side. Advantageously, a user may compare the two video segments to evaluate whether the reframing effect has produced a new video segment that is acceptable for the user.

Figure 3:
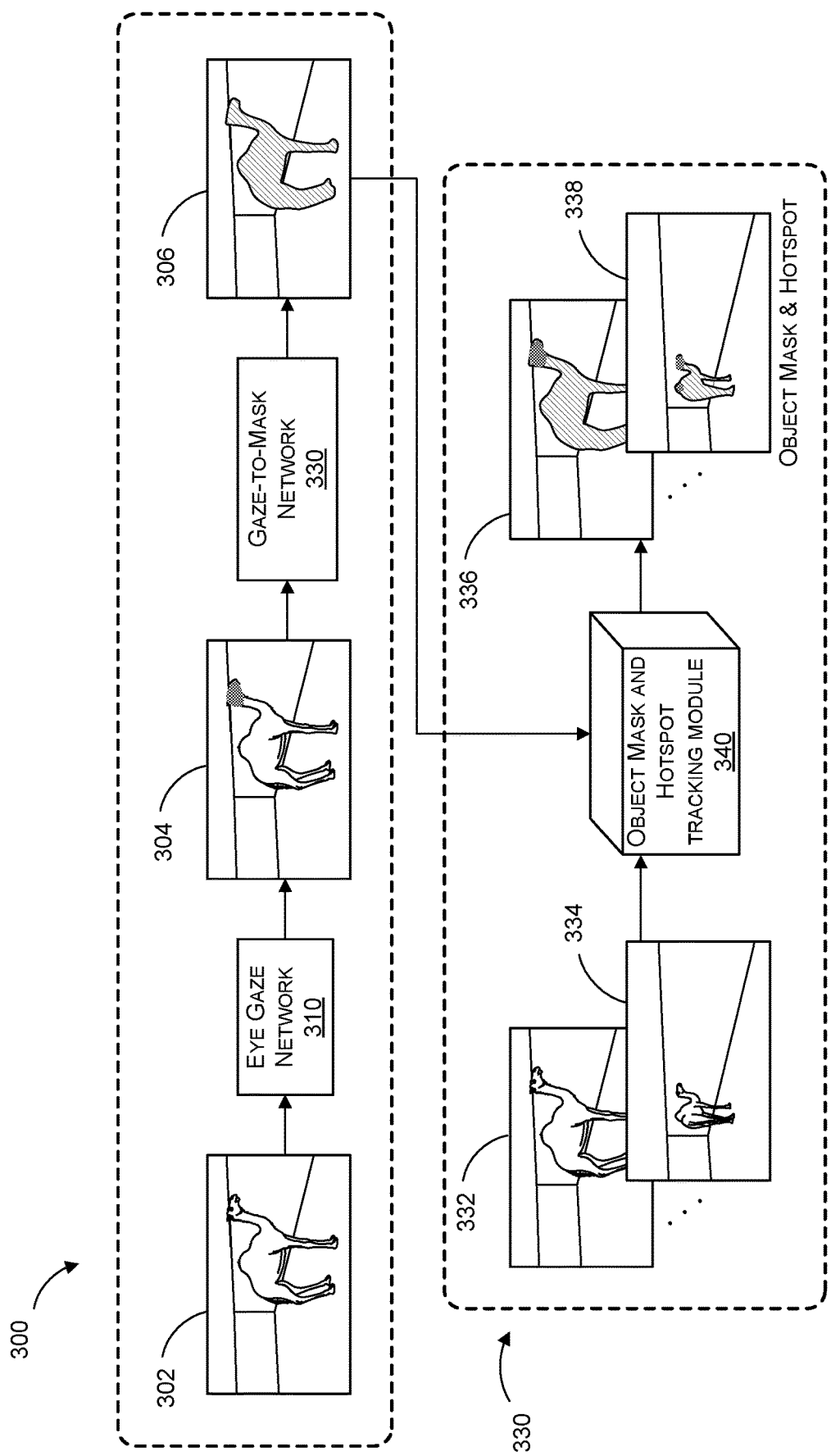
FIG. 3 illustrates an object mask and hotspot tracking process, in accordance with embodiments of the present invention.

With reference to FIG. 3, FIG. 3 illustrates the object detection process 300 and hotspot and mask tracking process 330, in accordance with embodiments of the present invention. In operation, an initial frame 302 of a video segment may be provided to eye-gaze network 310 to produce a hotspot map 304, indicating a predicted intra-object focal point (e.g., hotspot) of the initial frame 302. The intra-object focal point effectively identifies an object of interest in the initial frame. The hotspot map 304 may then be provided to the gaze-to-mask network 320. The gaze-to-mask network 320 may produce an object mask 306 based on the hotspot map 304, indicating the shape of the object that was identified by the eye-gaze network 304.

The hotspot and mask tracking process 330, in operation, may receive a video segment 334, an initial frame 332 (which is the same as initial frame 302 above) of the video segment 334, and object mask 306 at an object mask and hotspot tracking module 340. The object mask and hotspot tracking module 340 may track an object in the video segment 334 based on generating bounding boxes for each frame of the video segment and predicting an object mask and a hotspot map for each of the frames of the video segment. For example, a hotspot and mask frame 336 corresponding to the initial frame 332 may be generated. Moreover, a hotspot and mask video segment 338 corresponding to video segment 334 may be generated. Advantageously, identifying a hotspot map and an object mask for each frame of a video segment allows a range of video reframing operations to be applied to the video segment, such as, for example, automatic zoom, video cropping and retargeting.

Figure 4:
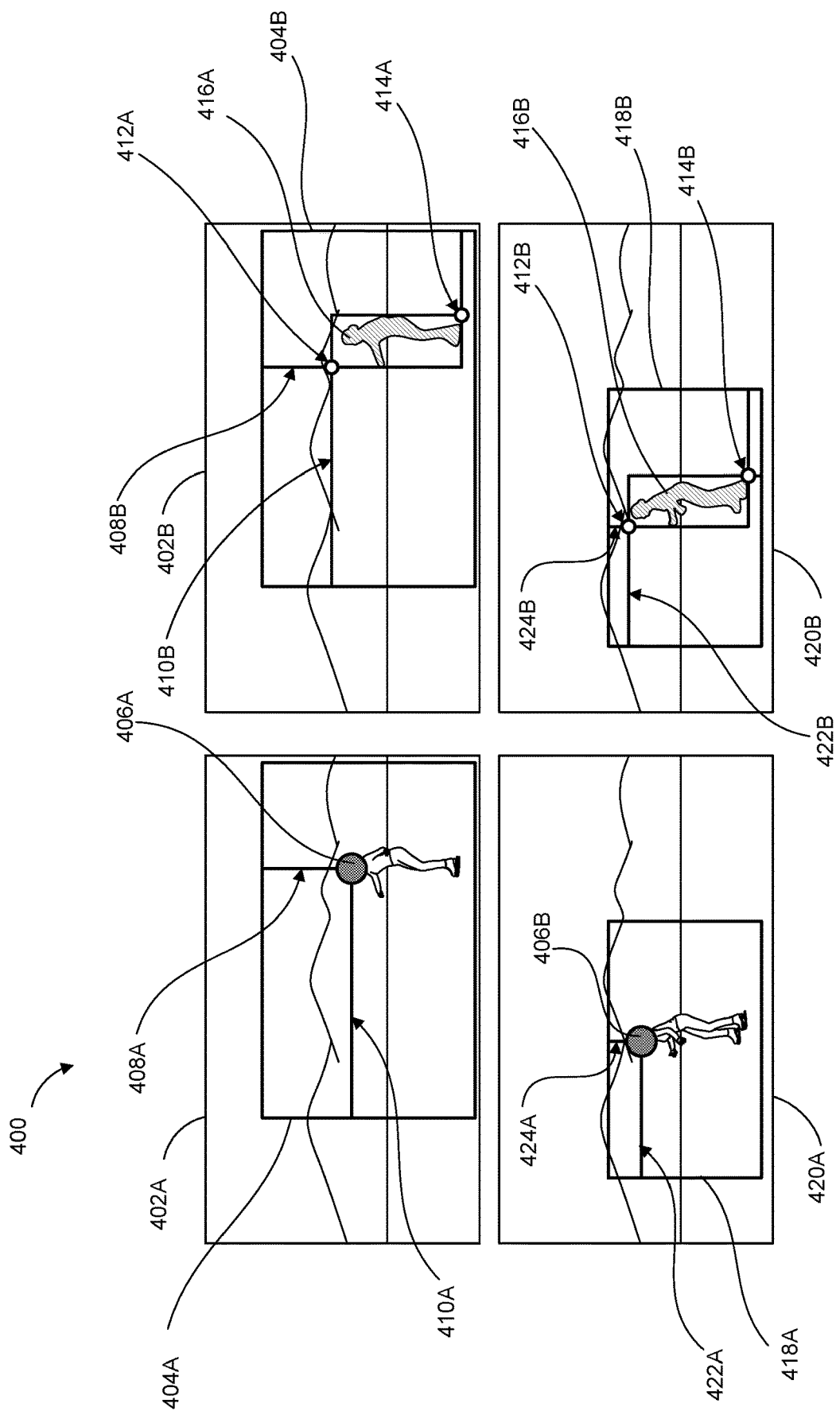
FIG. 4 illustrates an exemplary reframing operation, in accordance with embodiments of the present invention.

FIG. 4 illustrates an exemplary reframing operation 400, in accordance with embodiments of the present invention. The exemplary illustration includes an initial frame 402A and 402B of a video segment with identified hotspot 406A and object mask 416A. The illustration further includes end frame 420A and 420B of the video segment with identified hotspot 406A and object mask 416B. For each of the frames, crop boxes 404A, 404B, 418A, and 418B may be generated based on the reframing logic.

In operation, the width and height of the crop box may be determined by user-specified parameters (e.g., aspect ratio) received via a user interface, or these dimensions may be determined based on a neural network trained to generate a crop box as described above. Based on the determined crop boxes 404A/B for the initial frame 402A/B and the end frames 420A/B, the reframing logic described above in connection with FIGS. 1 and 2 may produce a consistent reframing effect on each frame of the video segment by determining an offset (e.g., a distance) between object reference points and the crop box. For example, starting X-axis offset 410A is equal to the distance in the X direction from the crop box 404A to the hotspot 406A and starting Y-axis offset 408A is equal to the distance in the Y direction from the crop box 404A to the hotspot 406A. Ending X-axis offset 422A is equal to the distance in the X direction from the crop box 418A to the hotspot 406B and ending Y-axis offset 424A is equal to the distance in the Y direction from the crop box 418A to the hotspot 406B. Based on the determined starting X-axis offset 410A and starting Y-axis offset 408A and the ending X-axis offset 422A and the ending Y-axis offset 424A, the crop box may change for each frame of the video segment relative to the hotspot 406A/B as a linear function of time associated with the frames of the video segment. Advantageously, by tracking an object via an identified hotspot and defining an offset relative to the hotspot, the reframing logic produces a consistent reframing effect for the video segment.

Similarly, object mask 416A may be used in place of, or in addition to, hotspot 406A for determining a starting X-axis offset 410B, a starting y-axis offset 408B, an ending X-axis offset 422B and an ending Y-axis offset 424B. However, rather than relying on hotspot 406A/B as a reference point, mask box points 412A and 414A may be used as starting reference points and mask box points 412B and 414B may be used as ending reference points. Each of these mask box points (e.g., 412A/B and 414A/B) may be considered in addition to the identified hotspots (e.g., 406A/B) for producing a desired reframing effect. Tracking these reference points relative to a crop box encourages the crop box to track an identified object within the frames of the video segment and to produce a linear relative movement of the reference points defined by the hotspot and the mask box points. As such, the object will be contained in the crop box and the relative position of the crop box in each frame of the video segment will appear smooth between the start and end frames of the video segment, even in instances when the object may move abruptly in the original video segment.

Figure 5:
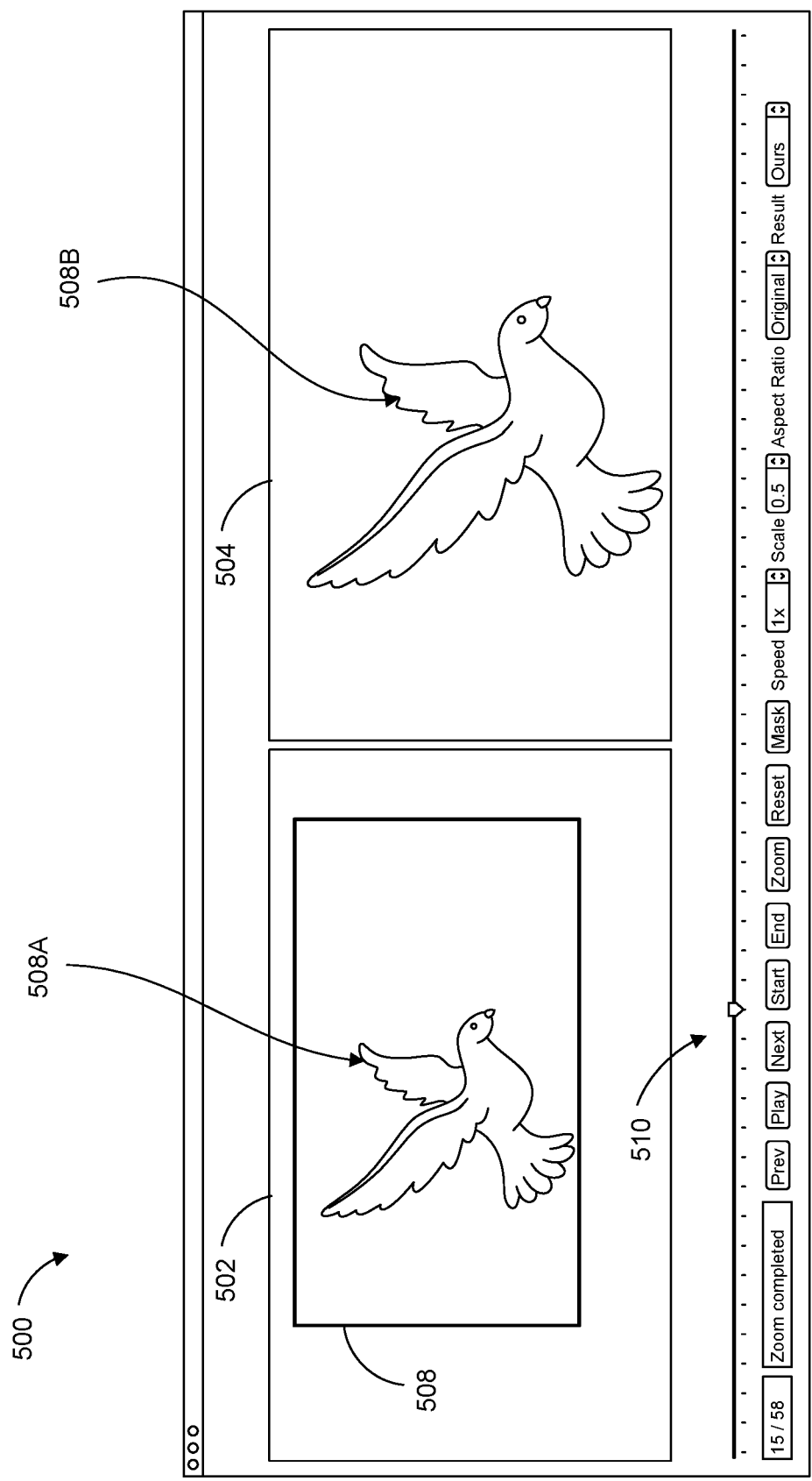
FIG. 5 illustrates an exemplary user interface, in accordance with embodiments of the present invention.

FIG. 5 illustrates an exemplary user interface 500, in accordance with embodiments of the present invention. The exemplary user interface 500 includes display 502 for viewing an original version of a video segment, display 504 for viewing the video segment with an applied editing effect (e.g., zoom-in, zoom-out, retargeting, object tag, lens blur effect) and a plurality of selection indicators 506. For example, the selection indicators 506 may include display buttons (e.g., Previous/Play/Next) to control the status of videos playing during video playback. The selection indicators 506 may further include operation buttons (e.g., Start/End/Zoom/Mask), which may be used to give initial settings for a cropping status or editing effect. The selection indicators 506 may further include list buttons (e.g., Speed/Scale/Aspect Ratio/Result), which may allow users to make setting choices for the editing and/or reframing process. In addition, the user interface 500 may include a slider bar 510 to indicate indexes of video frames and to show video progress during video playback, which the user may refer to select a start/end frame of the video segment.

In operation, a user may define various parameters for causing an editing effect on a video segment by making selections on selection indicators 506. For example, a user may select an aspect ratio for a cropping box, a zoom speed, a visual effect, and/or a specific reframing effect the user wishes to apply to a video segment. After these parameters have been selected, a user may draw bounding boxes on any frame of the video segment for a reframing operation. For example a user may define a start and/or end bounding box for a video cropping process. Additionally or alternatively, a user may select a salient portion of a video frame for adding an object tag, lens blur or other visual effect. The user's selections may be output to the reframing engine of the present disclosure, which may perform an editing effect and return a modified version of the video segment. The user may then view the original version of the video segment in display 502 and the modified version of the video segment in display 504. These two versions of the video segment may be displayed simultaneously. Additionally, the user may view the crop box 508 that was produced by the reframing engine to perform the reframing effect. The crop box 508 may correspond with the full frame of display 504. As can be seen, object 508A and object 508B are the same object in the same frame of the video segment. However, object 508B appears larger in display 504 because a reframing effect has been performed on the original video segment using crop box 508 to zoom in on the object 508A/B and to adjust the position of the object in the frame of the display. Advantageously, the user can view the original version and the modified version of the video segment to compare the two and evaluate whether the user is satisfied with the editing effect.

Additionally, a user may select 'Mask' from the selection indicators 506 to view a hotspot map and a mask. The hotspot map and mask may be viewed for a frame of the video segment or for each frame of the video segment while the video segment is played in a display window. The hotspot map and mask may be viewed by the user in either an offline mode or an online mode where an object may be tracked in real-time. Real-time object tracking may allow for live reframing (e.g., zooming) for better image capture and composition.

Users may preview a variety of editing effects via user interface 500. The interface provides users with an automatic zoom effect. To process a video with the automatic zoom effect, a user may define a zoom scale via the selection indicators 506. For example a user may select a zoon scale between 0.4-0.9. The user may then select a selection indicator to perform the zoom operation and subsequently view the zoom operation in the display 504. The automatic zoom effect may also allow a user to define a zoom speed (e.g., 2× or 0.5×) by selecting a zoom speed from a drop-down list.

Figure 6:
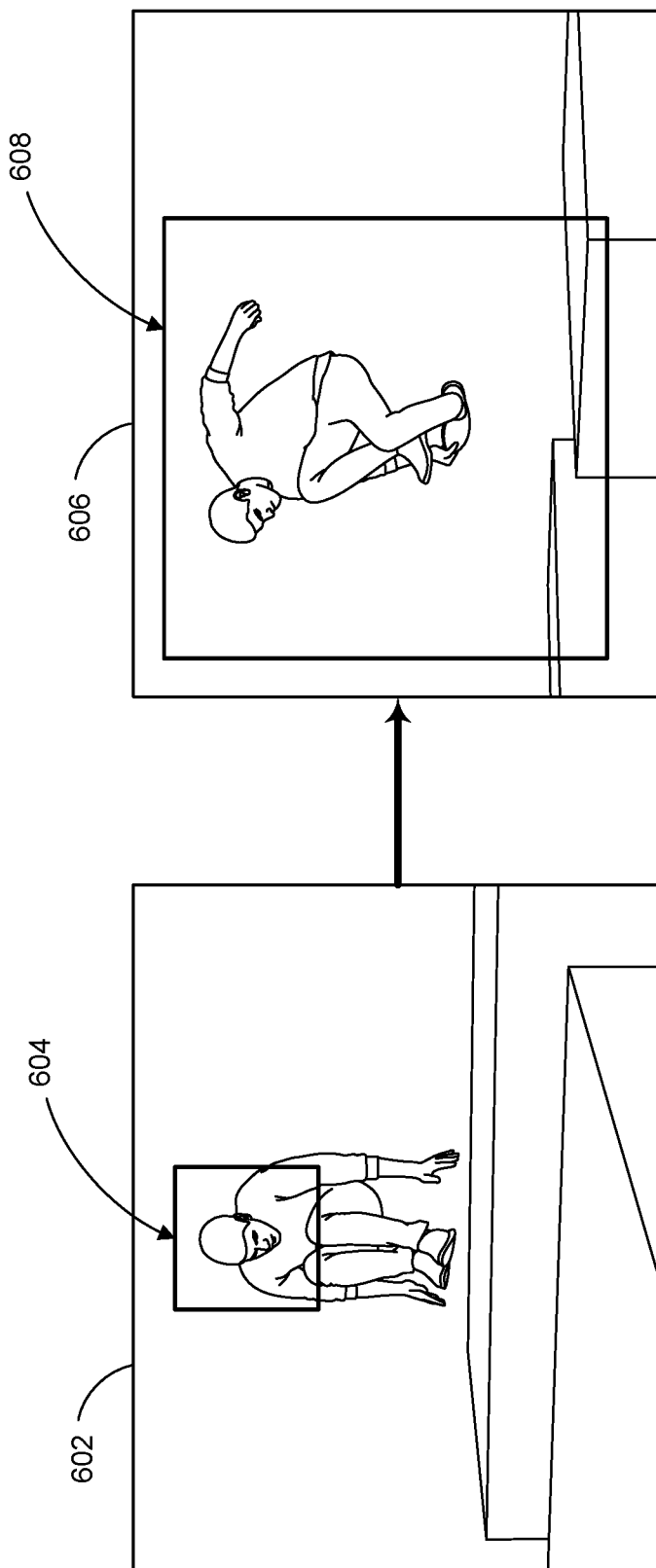
FIG. 6 illustrates an exemplary automatic zoom reframing effect, in accordance with embodiments of the present invention.

FIG. 6 illustrates an exemplary user-specified zoom reframing effect, in accordance with embodiments of the present invention. A user may, via the user interface 500 of FIG. 5, define start and/or end box for a video segment. Based on defined start and/or end box, the reframing engine may produce a zoom in/out reframing effect to adjust the visible frame of the video segment. In operation, a user may define an aspect ratio (e.g., using selection indicators 506) and then select a start frame by moving slider 510 until a desired frame 602 is visible in display 502 (shown in user interface of FIG. 5). The user may then draw bounding box 604. A similar process may then be performed on end frame 606 to draw bounding box 608. The user may then select 'Play' from the selection indicators 506 to preview the user-specified zoom reframing effect. Based on the user-specified parameters, as described in detail above, the reframing engine may detect a hotspot and mask for an object in the starting frame 602 and track the object in the frames of the video segment in accordance with the present invention. Based on the tracking information, the reframing engine may generate a modified video segment with a starting frame corresponding to bounding box 604 and adjust the bounding box for each frame of the video segment to track the object and end with an ending frame corresponding to bounding box 608. For example, the preview shown in display 504 would start by showing the view within bounding box 604. The preview would then track the object in the bounding box (e.g., the man) and the preview would gradually zoom out, while still tracking the object, until the final frame of the preview matches bounding box 608.

Figure 7:
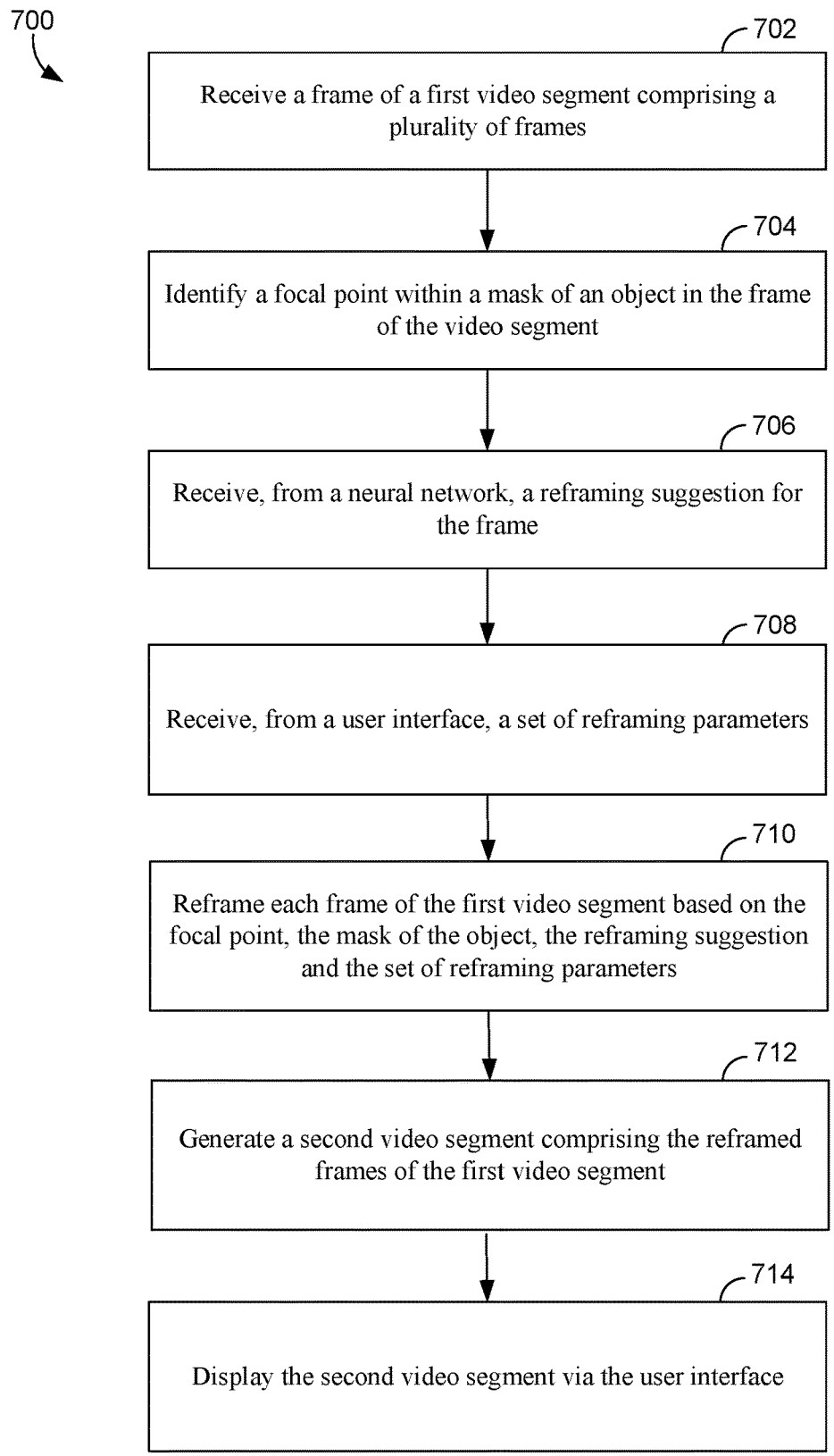
FIG. 7 illustrates an exemplary flow diagram for generating a video segment with an applied reframing effect, in accordance with embodiments of the present invention.

With reference to FIG. 7, a flow diagram is provided illustrating method 700 for reframing frames of a video. Each block of methods 700, and any other methods described herein, comprise a computing process performed using any combination of hardware, firmware, and/or software. For instance, various functions can be carried out by a processor executing instructions stored in memory. The methods can also be embodied as computer-usable instructions stored on non-transitory computer storage media. The methods can be provided by a standalone application, a service or hosted service (standalone or in combination with another hosted service), or a plug-in to another product, to name a few. The method 700 may be implemented by the video editing system 100 as described in conjunction with FIGS. 1-6.

With reference to FIG. 7, FIG. 7 illustrates a method 700, in accordance with embodiments described herein. Method 700 can be performed, for instance, by video editing system 100 of FIG. 1. Initially at block 702, a frame of a first video segment comprising a plurality of frames is received. At block 704 a focal point within a mask of an object in the frame of the video segment is identified. At block 706, a reframing suggestion for the frame is received from a neural network. At block 708, a set of reframing parameters is received from a neural network. At block 710, each frame of the first video segment based on the focal point, the mask of the object, the reframing suggestion and the set of reframing parameters is reframed. At block 712, a second video segment comprising the reframed frames of the first video segment is generated. At block 714, the second video segment is displayed via the user interface.

Illustrative Computing Environment

Figure 8:
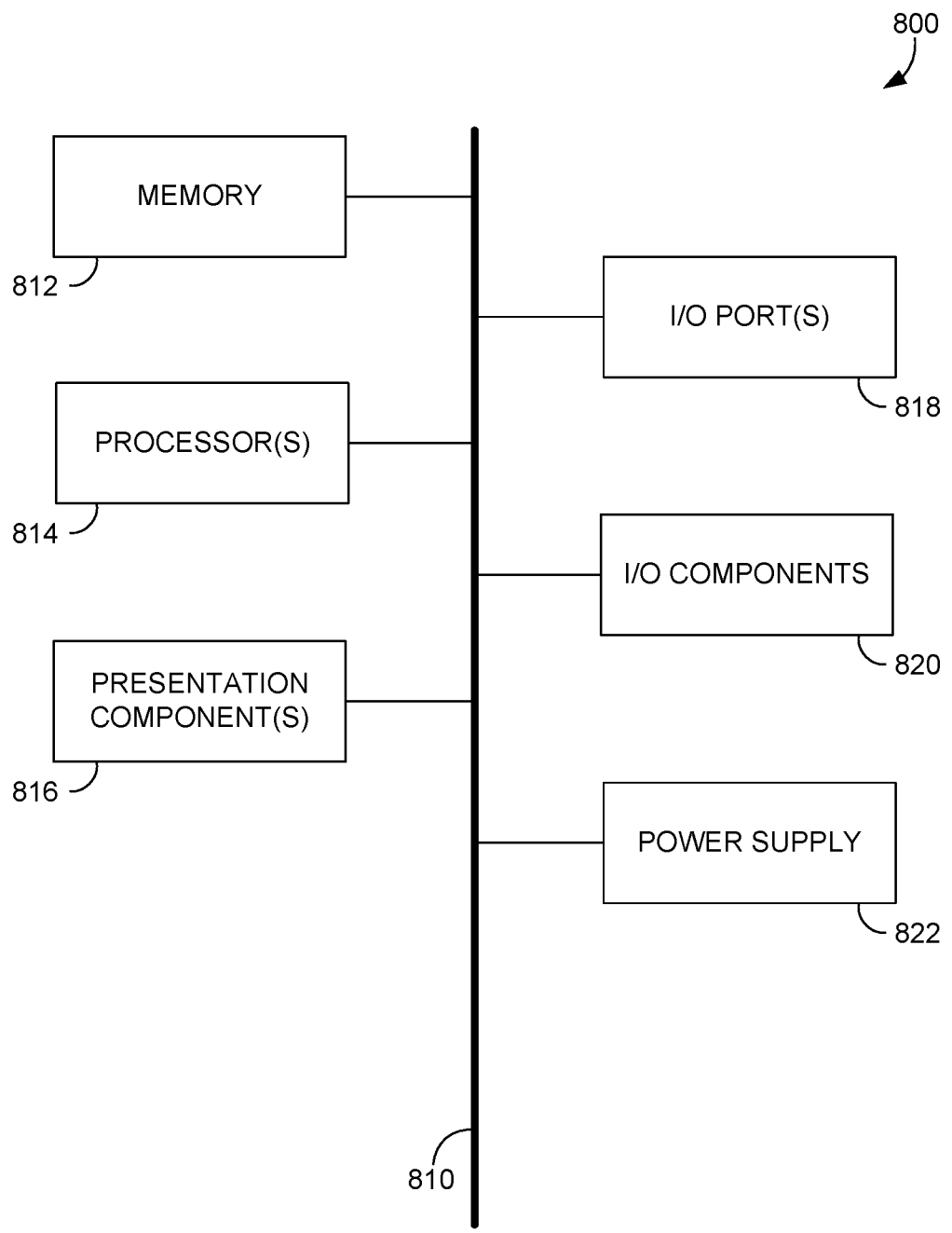
FIG. 8 is an example operating environment for implementing embodiments of the present invention.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of non-transitory computer-readable media. Non-transitory computer-readable media can be any available media that can be accessed by computing device 800 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 700 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native)

instruction set for a given processor. The processor recognizes the native instructions and performs corresponding low-level functions relating, for example, to logic, control and memory operations. Low level software written in machine code can provide more complex functionality to higher levels of software. As used herein, computer-executable instructions include any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A method comprising:
   receiving, at a first neural network, a frame of a first video segment comprising a plurality of frames;
   identifying, by the first neural network, a focal point within a mask of an object in the frame of the video segment;
   receiving, from a second neural network, a reframing suggestion for the frame;
   receiving, from a user interface, a set of reframing parameters;
   reframing, by the reframing engine, each frame of the first video segment based on the focal point, the mask of the object, the reframing suggestion and the set of reframing parameters;
   generating, by the reframing engine, a second video segment comprising the reframed frames of the first video segment; and
   causing display of the second video segment.

2. The method of claim 1, wherein the first neural network is configured for determining a salient portion within an object of an image, and generating a mask of the object.

3. The method of claim 1, wherein the reframing suggestion is generated based on one or more inputs received via a user interface, and the second neural network, wherein the second neural network is trained to identify optimal image composition using identified objects.

4. The method of claim 1, wherein the reframing parameters may be selected from one or more of:

an aspect ratio, a zoom speed, a retargeting effect, a zoom effect, and a user-defined crop box.

5. The method of claim 1, wherein the reframing comprises cropping each frame of the video segment based on the location of the focal point and the mask of the object in the frame, the reframing suggestion, and the set of reframing parameters.

6. The method of claim 5, wherein the cropping further comprises maintaining, by the reframing engine, a temporally relative position between a cropping box and the focal point and the mask of the object.

7. The method of claim 1, further comprising:
generating, by the reframing engine, a composite video segment that includes an overlay of the focal point and the mask and the first video segment; and
displaying the composite video in a display window of the user interface.

8. A computerized system comprising:
one or more computer processors; and
computer memory storing computer-useable instructions that, when used by the one or more computer processors, cause the one or more computer processors to perform operations comprising:
receiving a frame of a first video segment comprising a plurality of frames;
identifying a focal point within a mask of an object in the frame of the video segment;
receiving, from a neural network, a reframing suggestion for the frame;
receiving, from a user interface, a set of reframing parameters;
reframing each frame of the first video segment based on the focal point, the mask of the object, the reframing suggestion and the set of reframing parameters;
generating a second video segment comprising the reframed frames of the first video segment; and
causing display of the second video segment.

9. The system of claim 8, wherein the focal point within the mask is determined based on at least one neural network configured for determining a salient portion within an object of an image, and generating a mask of the object.

10. The system of claim 8, wherein the reframing suggestion is generated based on one or more inputs received via the user interface, and a neural network trained to identify optimal image composition using identified objects.

11. The system of claim 8, wherein the reframing parameters may be selected from one or more of:
an aspect ratio, a zoom speed, a retargeting effect, a zoom effect, and a user-defined crop box.

12. The system of claim 8, wherein the reframing comprises cropping each frame of the video segment based on the location of the focal point and the mask of the object in the frame, the reframing suggestion, and the set of reframing parameters.

13. The system of claim 12, wherein the cropping further comprises maintaining a temporally relative position between a cropping box and the focal point and the mask of the object.

14. The system of claim 8, further comprising:
generating a composite video segment that includes an overlay of the focal point and the mask and the first video segment; and
displaying the composite video in a display window of the user interface.

15. A video editing system comprising:
means for receiving a frame of a first video segment comprising a plurality of frames;
means for identifying a focal point within a mask of an object in the frame of the video segment;
means for receiving, from a neural network, a reframing suggestion for the frame;
means for receiving, from a user interface, a set of reframing parameters;
means for reframing each frame of the first video segment based on the focal point, the mask of the object, the reframing suggestion and the set of reframing parameters;
means for generating a second video segment comprising the reframed frames of the first video segment; and
means for causing display of the second video segment.

16. The video editing system of claim 15, wherein the focal point within the mask is determined based on at least one neural network configured for determining a salient portion within an object of an image, and generating a mask of the object.

17. The video editing system of claim 16, wherein the reframing suggestion is generated based on one or more inputs received via the user interface, and a neural network trained to identify optimal image composition using identified objects.

18. The video editing system of claim 17, wherein the reframing parameters may be selected from one or more of:
an aspect ratio, a zoom speed, a retargeting effect, a zoom effect, and a user-defined crop box.

19. The video editing system of claim 15, wherein the reframing comprises cropping each frame of the video segment based on the location of the focal point and the mask of the object in the frame, the reframing suggestion, and the set of reframing parameters.

20. The video editing system of claim 15, wherein the cropping further comprises maintaining a temporally relative position between a cropping box and the focal point and the mask of the object.

* * * * *